United States Patent
Nenmeni et al.

(10) Patent No.: US 10,041,407 B2
(45) Date of Patent: Aug. 7, 2018

(54) SYSTEM AND METHOD FOR AIR EXTRACTION FROM GAS TURBINE ENGINES

(75) Inventors: Vijay Anand Raghavendran Nenmeni, Atlanta, GA (US); Michael Joseph Alexander, Simpsonville, SC (US); Paul William Plummer, Houston, TX (US); Timothy Lee Janssen, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 2133 days.

(21) Appl. No.: 13/075,026

(22) Filed: Mar. 29, 2011

(65) Prior Publication Data

US 2012/0247113 A1    Oct. 4, 2012

(51) Int. Cl.
*F02C 6/08*     (2006.01)
*F01D 13/00*    (2006.01)
*F02C 9/18*     (2006.01)

(52) U.S. Cl.
CPC .............. *F02C 6/08* (2013.01); *F01D 13/00* (2013.01); *F02C 9/18* (2013.01); *F05D 2260/80* (2013.01); *F05D 2270/301* (2013.01); *F05D 2270/3061* (2013.01)

(58) Field of Classification Search
CPC .............. F02C 9/18; F02C 6/08; F01D 13/00
USPC ........... 60/782, 785, 795, 39.15, 39.21, 794
See application file for complete search history.

(56) References Cited

U.S. PATENT DOCUMENTS

| | | | | |
|---|---|---|---|---|
| 2,665,548 A | * | 1/1954 | Traupel | 60/39.15 |
| 3,403,507 A | * | 10/1968 | Schuster | 60/39.15 |
| 3,777,480 A | | 12/1973 | Stoltman | |
| 3,835,642 A | | 9/1974 | Amann | |
| 3,918,254 A | | 11/1975 | Wernberg | |
| 3,971,208 A | | 7/1976 | Schwent | |
| 3,973,391 A | * | 8/1976 | Reed et al. | 60/794 |
| 3,978,658 A | | 9/1976 | Forbes et al. | |
| 4,083,181 A | | 4/1978 | Adamson | |
| 4,180,249 A | * | 12/1979 | Agranovskaya et al. | 266/78 |
| 4,236,869 A | | 12/1980 | Laurello | |
| 4,671,318 A | * | 6/1987 | Benson | 137/486 |
| 4,735,056 A | * | 4/1988 | Goodman | 62/172 |

(Continued)

FOREIGN PATENT DOCUMENTS

| | | |
|---|---|---|
| EP | 0496571 A1 | 7/1992 |
| EP | 0507725 A1 | 10/1992 |

(Continued)

*Primary Examiner* — Pascal M Bui Pho
*Assistant Examiner* — Stefan Ibroni
(74) *Attorney, Agent, or Firm* — Fletcher Yoder, P.C.

(57) ABSTRACT

The disclosed embodiments relate to a system and method that allows air to be extracted from a plurality of gas turbine engines and fed to a downstream process, even in situations in which one or more of the gas turbine engines are operating in a part load condition. For example, in an embodiment, a method includes monitoring signals representative of a header pressure of a header, or a pressure of extraction air flow from one or more gas turbine engines to the header, or both, and maintaining substantially continuous flows of extraction air from the gas turbine engines to the header. The substantially continuous flows are maintained when the gas turbine engines are under symmetric and asymmetric load conditions.

17 Claims, 4 Drawing Sheets

(56) References Cited

U.S. PATENT DOCUMENTS

| | | | |
|---|---|---|---|
| 4,765,131 A * | 8/1988 | Benson | 60/782 |
| 4,765,135 A | 8/1988 | Lardellier | |
| 4,766,721 A | 8/1988 | Iizuka et al. | |
| 4,815,285 A | 3/1989 | Martin | |
| 4,823,546 A | 4/1989 | Cheng | |
| 4,876,857 A | 10/1989 | Feltz et al. | |
| 4,899,537 A | 2/1990 | Cheng | |
| 4,901,520 A | 2/1990 | Kozak et al. | |
| 4,907,406 A | 3/1990 | Kirikami et al. | |
| 4,936,097 A | 6/1990 | Rodgers | |
| 5,137,230 A * | 8/1992 | Coffinberry | 244/118.5 |
| 5,155,991 A * | 10/1992 | Bruun | 60/785 |
| 5,155,993 A | 10/1992 | Baughman et al. | |
| 5,241,816 A | 9/1993 | Drnevich | |
| 5,421,166 A | 6/1995 | Allam et al. | |
| 5,437,160 A | 8/1995 | Darredeau et al. | |
| 5,511,937 A | 4/1996 | Papageorgiou | |
| 5,531,566 A | 7/1996 | Derouet et al. | |
| 5,649,416 A * | 7/1997 | Moore | 60/39.15 |
| 5,722,259 A | 3/1998 | Sorensen et al. | |
| 5,740,673 A | 4/1998 | Smith et al. | |
| 5,802,875 A | 9/1998 | Drnevich | |
| 5,901,547 A | 5/1999 | Smith et al. | |
| 5,963,883 A * | 10/1999 | Cunkelman et al. | 702/47 |
| 6,141,955 A * | 11/2000 | Akiyama et al. | 60/39.15 |
| 6,260,350 B1 | 7/2001 | Horii et al. | |
| 6,295,838 B1 | 10/2001 | Shah et al. | |
| 6,494,047 B2 * | 12/2002 | Yeung | 60/782 |
| 6,503,052 B1 | 1/2003 | Caillet | |
| 6,530,210 B2 | 3/2003 | Horii et al. | |
| 6,568,167 B2 | 5/2003 | Horii et al. | |
| 6,568,168 B2 | 5/2003 | Horii et al. | |
| 6,644,012 B2 | 11/2003 | Hoffmann et al. | |
| 6,698,182 B2 | 3/2004 | Sonoda et al. | |
| 6,705,074 B2 | 3/2004 | Horii et al. | |
| 6,711,888 B2 | 3/2004 | Horii et al. | |
| 6,779,332 B2 | 8/2004 | Horii et al. | |
| 6,779,346 B2 | 8/2004 | Nichols et al. | |
| 6,782,701 B2 * | 8/2004 | Liu et al. | 60/782 |
| 7,036,319 B2 * | 5/2006 | Saunders et al. | 60/782 |
| 7,040,083 B2 | 5/2006 | Horii et al. | |
| 7,143,573 B2 | 12/2006 | Hoffmann et al. | |
| 7,299,618 B2 | 11/2007 | Terazaki et al. | |
| 7,536,865 B2 * | 5/2009 | Mikhail | 60/795 |
| 7,784,288 B2 * | 8/2010 | Thatcher et al. | 60/795 |
| 2005/0172633 A1 * | 8/2005 | Cooper et al. | 60/772 |
| 2006/0254280 A1 | 11/2006 | Briesch et al. | |
| 2007/0137213 A1 | 6/2007 | Rickert et al. | |
| 2007/0271929 A1 | 11/2007 | Berry | |
| 2009/0193811 A1 * | 8/2009 | Monteiro et al. | 60/782 |
| 2009/0324386 A1 | 12/2009 | Takamura et al. | |
| 2010/0107594 A1 | 5/2010 | Coffinberry et al. | |
| 2010/0162719 A1 | 7/2010 | Bowman et al. | |
| 2010/0162720 A1 | 7/2010 | Bowman et al. | |
| 2010/0164234 A1 | 7/2010 | Bowman et al. | |
| 2010/0326089 A1 * | 12/2010 | Weber et al. | 60/783 |

FOREIGN PATENT DOCUMENTS

| | | |
|---|---|---|
| EP | 0889212 B1 | 12/2004 |
| WO | 1985003550 | 8/1985 |
| WO | 1998055811 | 12/1998 |

* cited by examiner

SYSTEM AND METHOD FOR AIR EXTRACTION FROM GAS TURBINE ENGINES

BACKGROUND

The subject matter disclosed herein relates to air extraction from gas turbine engines, and more specifically to regulating the pressure of extracted air from a combination of gas turbine engines.

A gas turbine engine includes a compressor, a combustor, and a turbine. The compressor generally provides compressed air to mix with fuel in the combustor, and the fuel air mixture combusts to generate hot gas to drive the turbine. In certain applications, external equipment may use air extracted from the compressor of the gas turbine engine. Unfortunately, the pressure of the air may vary based on various operating conditions of the gas turbine engine. For example, if the gas turbine engine operates at a partial load condition, then the pressure of the air may be inadequate for the external equipment mentioned above. Therefore, existing systems do not use the air extracted from the gas turbine engine while operating in a partial load condition.

BRIEF DESCRIPTION

Certain embodiments commensurate in scope with the originally claimed invention are summarized below. These embodiments are not intended to limit the scope of the claims, but rather these embodiments are intended only to provide a brief summary of possible forms of the present approaches. Indeed, the present disclosure may encompass a variety of forms that may be similar to or different from the embodiments set forth below.

In one embodiment, a system is provided that includes an extraction air header configured to receive a first extraction air flow from a first compressor of a first gas turbine engine and a second extraction air flow from a second compressor of a second gas turbine engine. The system also includes an extraction air controller configured to maintain the first and second extraction air flows to the extraction air header in a symmetric load condition and an asymmetric load condition. The symmetric load condition represents substantially equal loads on the first and second gas turbine engines, and the asymmetric load condition represents substantially different loads on the first and second gas turbine engines.

In another embodiment, a method is provided that includes monitoring a first signal representative of a first flow of extraction air from a first gas turbine engine and a second signal representative of a second flow of extraction air from a second gas turbine engine, or a third signal representative of a header pressure of an extraction air header, or a combination, with an extraction air controller. The method further includes maintaining the first and second extraction air flows to the extraction air header in a symmetric load condition and an asymmetric load condition. The symmetric load condition represents substantially equal loads on the first and second gas turbine engines, and the asymmetric load condition represents substantially different loads on the first and second gas turbine engines.

In a further embodiment, a system is provided that includes a non-transitory machine-readable medium. The medium includes code having one or more computer-executable routines. The routines include monitoring a first signal representative of a first flow of extraction air from a first gas turbine engine and a second signal representative of a second flow of extraction air from a second gas turbine engine, or a third signal representative of a header pressure of an extraction air header, or any combination thereof, with an extraction air controller. The routines also include maintaining the first and second extraction air flows to the extraction air header in a symmetric load condition and an asymmetric load condition. The symmetric load condition represents substantially equal loads on the first and second gas turbine engines, and the asymmetric load condition represents substantially different loads on the first and second gas turbine engines.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
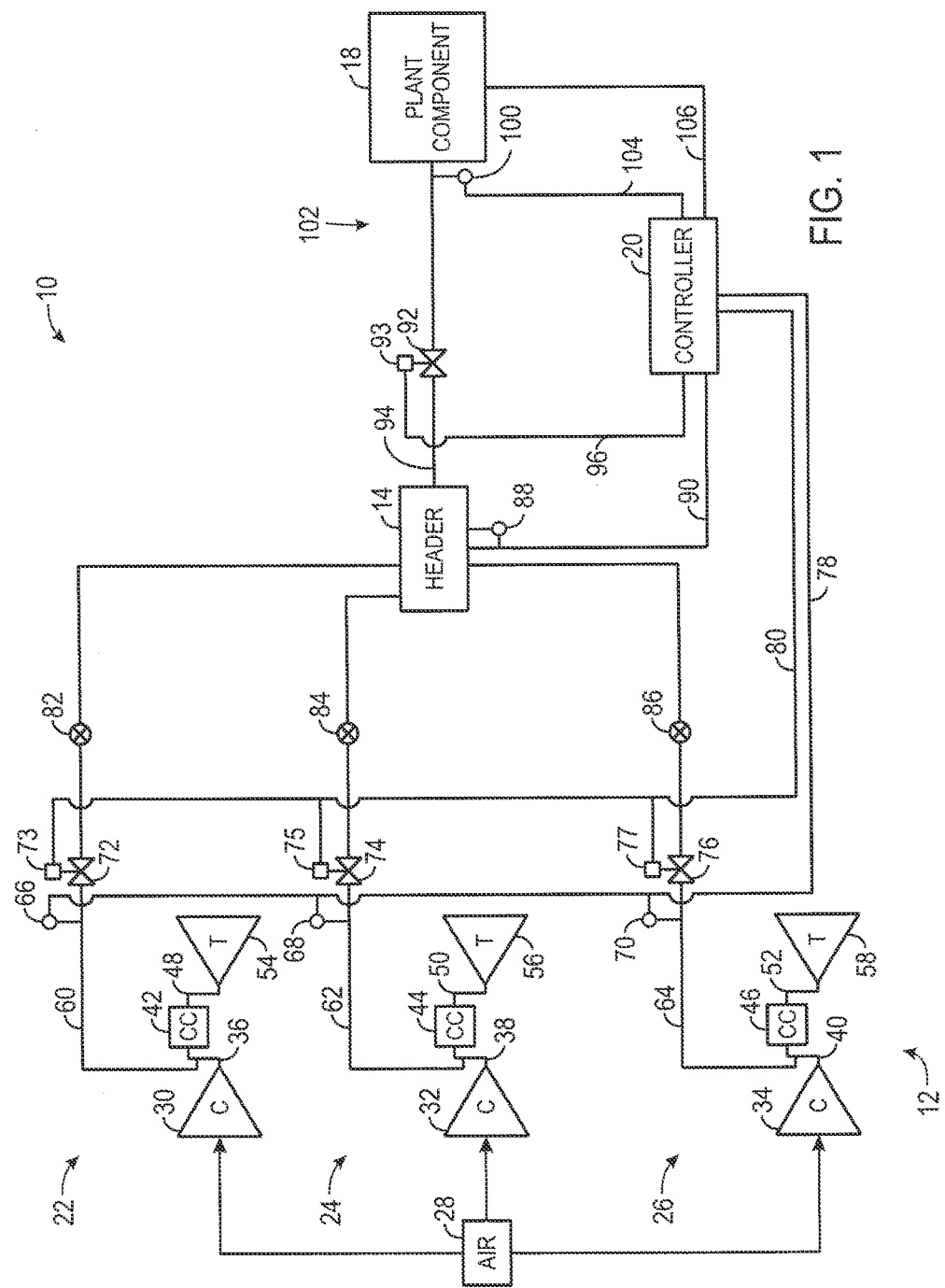
FIG. 1 is a diagrammatical illustration of an embodiment of a system configured to extract air from a plurality of gas turbine engines and provide the extracted air to a downstream process.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In some systems, a plurality of gas turbine engines may operate at a symmetric load condition, which is represented by substantially equal loads on each of the gas turbine engines. However, in some situations, the operating condition of the plurality of engines may change to an asymmetric load condition, wherein one or more gas turbine engines within the system drop to a part load condition. Such a drop may prevent the extraction of air at a pressure suitable for use in some downstream processes, such as in an air separation unit (ASU). Unfortunately, many processes directed towards mitigating such occurrences may involve stopping extraction feed to the downstream process by cutting off extraction flow from the gas turbine engines operating at part load (i.e., off-design) conditions. The present embodiments overcome these and other shortcoming of existing approaches and systems by providing a system and method that allows air to be extracted from a plurality of gas turbine engines and fed to a downstream process, even in situations in which one or more of the gas turbine engines are operating in an asymmetric load condition. As an example, an asymmetric load condition may include situations where one or more gas turbine engines are operating at part load, or when one or more gas turbine engines are operating in a degraded condition. The degraded condition may be an operating condition where a gas turbine engine is operating at full or base load, but its extraction air pressure is insufficient for a downstream process.

As an example embodiment, a header downstream of a plurality of gas turbine engines may combine the air that is extracted from each turbine, resulting in a header pressure, referred to herein as "$P_{HEADER}$," and may provide the combined air to a downstream process. In embodiments where the pressure of the extracted air from the plurality of gas turbine engines fluctuates, $P_{HEADER}$ fluctuates as well. When at least one of the gas turbine engines drops to a part load operating condition or is in a degraded condition, $P_{HEADER}$ may be regulated to a pressure substantially equal to, or a predetermined amount less than, the lowest air extraction pressure of the plurality of gas turbine engines. For example, as discussed herein, adjusting the header pressure may include the acts of adjusting one or more flow pressures upstream of the header, adjusting one or more flow pressures downstream of the header, adjusting the pressure at the header (e.g., using one or more valves directly on or attached to the header), or any combination thereof. In one embodiment, the predetermined amount may be representative of piping pressure losses between the gas turbine engine and the header. By regulating the pressure of the header in this way, each gas turbine may contribute to the overall extraction air feed to the downstream process. Such processes may include air separation, various compressors, heat exchangers, gas export, and so on.

Figure 2:
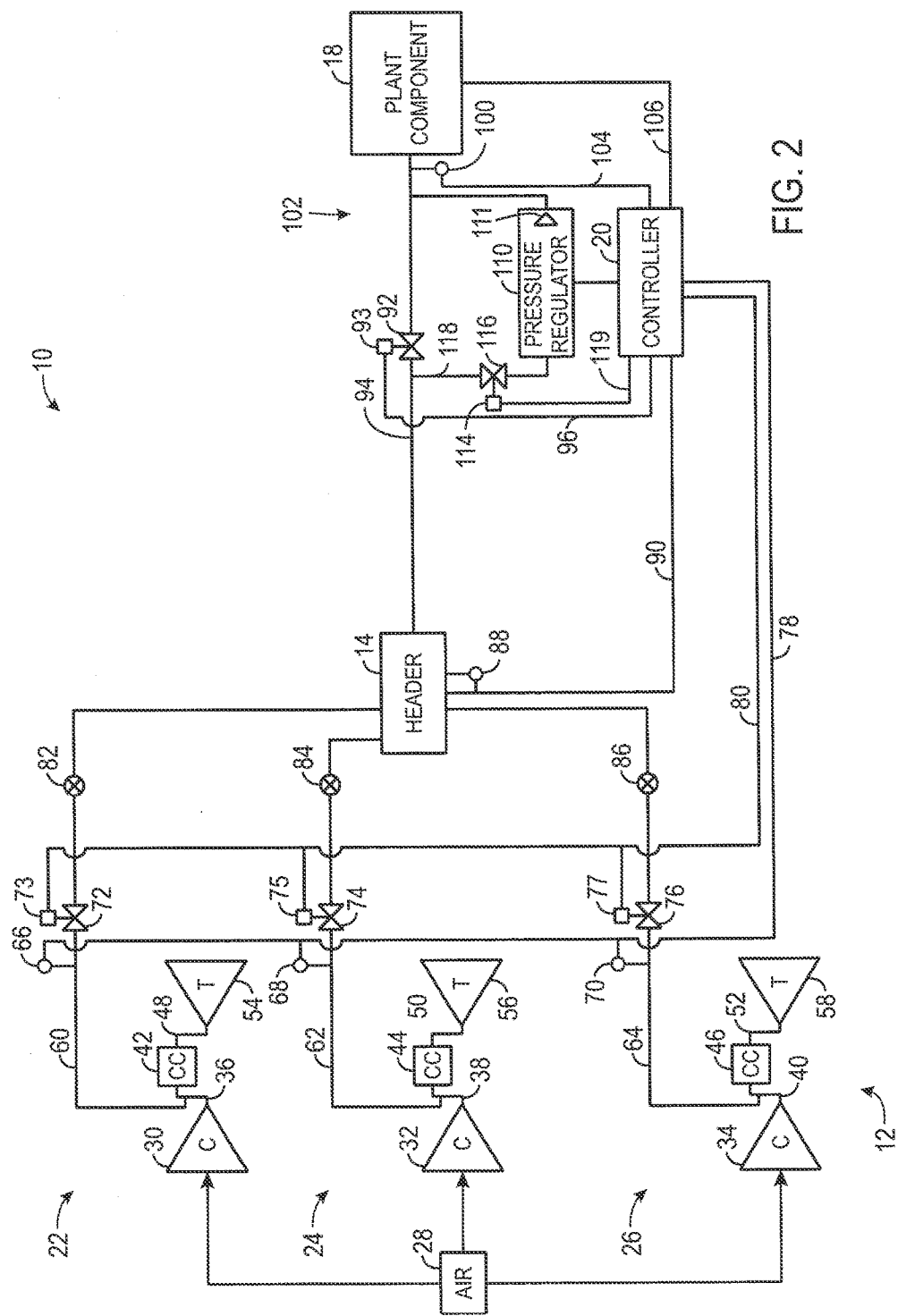
FIG. 2 is a diagrammatical illustration of another embodiment of a system configured to extract air from a plurality of gas turbine engines and provide the extracted air to a downstream process.
Figure 3:
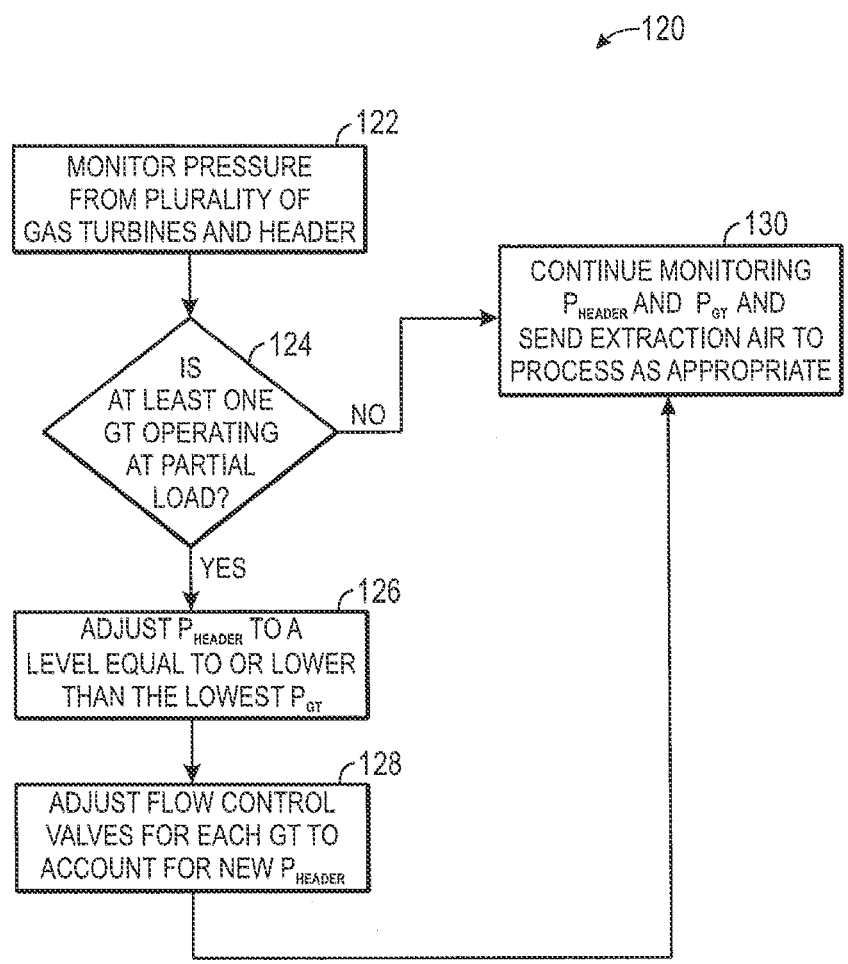
FIG. 3 is a process flow diagram illustrating an embodiment of a method for extracting air from a plurality of gas turbine engines and providing the extracted air to a downstream process at a substantially constant pressure.
Figure 4:
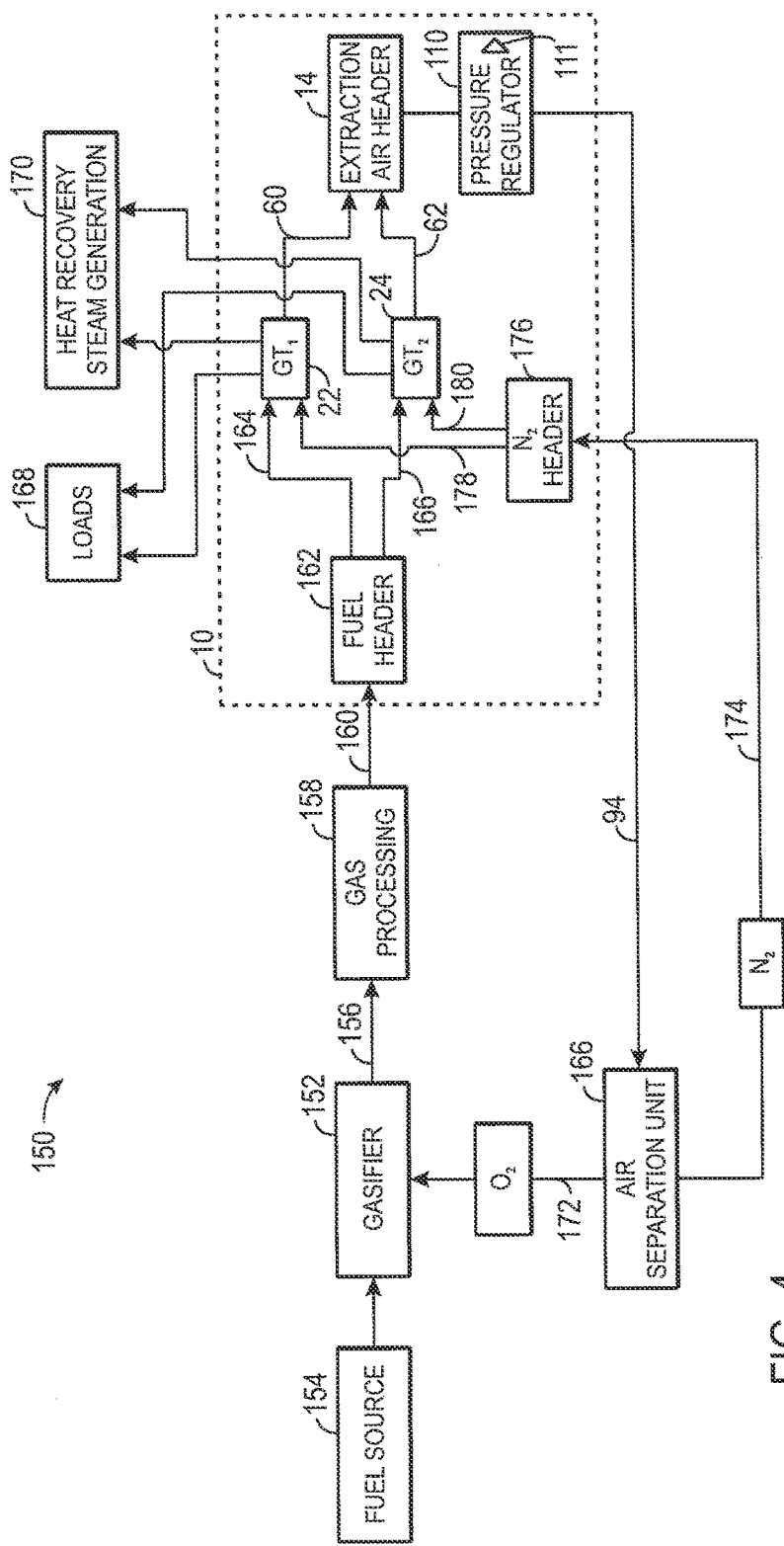
FIG. 4 is a block diagram illustrating an embodiment of an integrated gasification combined cycle (IGCC) plant having the system of FIGS. 1 or 2.

Keeping in mind that the gas turbine engines described herein may be used in combination with various features of a plant or any energy-generating system, such as various gasification units, fuel sources, air purification sources, and so on, FIGS. 1 and 2 are diagrammatical illustrations of systems configured to regulate the extraction of air from a plurality of gas turbine engines. FIG. 3 is a process flow diagram of an embodiment of a method of operating such systems, and FIG. 4 is a block diagram of an embodiment of a plant system that may utilize the air extraction control systems and methods described herein.

Moving to FIG. 1, a system 10 is illustrated having a plurality of gas turbine engines 12 configured to output extraction air to a header 14 disposed downstream from each of the engines 12. The header 14 generally combines the extracted air, which may be sent to a plant component 18 disposed downstream from the header 14. As an example, the plant component 18 may include an ASU, as mentioned above, a generator, a compressor, or any system that may utilize air at a substantially constant pressure. The system 10 also includes a controller 20, which may be a distributed control system (DCS), an application-specific computer, a general purpose computer, or the like. The controller 20, as illustrated, is connected to various components that are configured to monitor and/or control the flow of extracted air. Further, these components may include features that enable the controller 20 to process the results of various monitoring operations, such as a processor, as well as store and execute one or more routines for controlling the operation of the system 10, such as a memory.

The plurality of gas turbine engines 12 may include at least two, for example 2, 3, 4 or more gas turbine engines 12. In the illustrated embodiment, the system 10 includes three gas turbine engines, a first gas turbine engine 22, a second gas turbine engine 24, and a third gas turbine engine 26. Each of the gas turbine engines 22, 24, 26 includes respective inlets configured to intake air 28, which may be atmospheric or air provided from another feed source. The gas turbine engines 22, 24, 26 also include respective compressors 30, 32, 34 that are configured to collect and compress the intake air 28 to generate respective flows of compressed air 36, 38, 40. Each compressor 30, 32, 34 may be a single stage compressor or a multi-stage compressor with 2 to 20 compression stages. The pressure to which each of the compressed air flows 36, 38, 40 are compressed may each depend on a number of factors, such as the distinct operational parameters for each of the gas turbine engines 22, 24, 26, as well as the load that is driven by each gas turbine engine. The compressed air 36, 38, 40, after compression, may then be provided to respective combustors or combustion chambers 42, 44, 46, where at least a portion of the compressed air is reacted with a fuel (e.g., synthesis gas (syngas), substitute natural gas, liquid fuel) to generate respective combustion gases 48, 50, 52. The hot combustion gases 48, 50, 52 produced in this process may drive turbines 54, 56, 58. Each turbine 54, 56, 58 may be a single stage turbine or a multi-stage turbine with 2 to 20 turbine stages. The turbines 54, 56, 58 may be used to drive a common load or respective loads, to generate electricity, and so on.

During operation, each of the combustion chambers 42, 44, 46 utilize a predetermined mixture of fuel, the compressed air 30, 32, 34, and other additives (e.g., diluent gas), where each are present in certain ratios. In some situations, the gas turbine engines 22, 24, 26 may compress more air than is suitable for use in the engines for a particular operation or load, e.g., for mixing with fuel in respective combustion chambers 42, 44, 46 and for cooling various turbine and/or plant components. In some embodiments, this excess air may be extracted along respective extraction lines 60, 62, 64 at respective pressures, referred to herein as $P_{GT1}$, $P_{GT2}$, and $P_{GT3}$. The controller 20 may monitor various operational parameters of the gas turbine engines 22, 24, 26 to ascertain the level of extracted air that may be appropriate for each gas turbine engine 22, 24, 26.

The controller 20 may monitor a flow and/or $P_{GT1}$, $P_{GT2}$, and $P_{GT3}$ of extracted air through each of the extraction lines 60, 62, 64 via respective pressure transducers 66, 68, 70 (e.g., pressure monitors, pressure gauges). Moreover, the controller 20 may be operatively connected to respective flow control valves 72, 74, 76 disposed along each of the extraction lines 60, 62, 64, which allows the controller 20 to control $P_{GT1}$, $P_{GT2}$, and $P_{GT3}$, respectively, and, in some embodiments, $P_{HEADER}$. For example, the controller 20 may monitor the pressure of extracted air by monitoring each of the pressure transducers 66, 68, 70, which are connected to the controller 20 by at least one communication line 78. In response to the monitored pressure and, in some embodiments, other inputs such as $P_{HEADER}$ and/or a predetermined pressure suitable for use in the downstream process, the controller 20 may send control signals along a control line 80 to one or more of the flow control valves 72, 74, 76 to adjust their respective positions. Specifically, in the illustrated embodiment, the controller 20 may send signals to respective drives or actuators 73, 75, 77 that move the flow control valves 72, 74, 76 to adjust their positions. Adjusting the flow of extracted air through the extraction lines 60, 62, 64 in this way may be one manner in which the controller 20 adjusts $P_{HEADER}$ and, in some embodiments, the pressure of extraction air feed to the downstream process (i.e., the plant component 18), which is referred to herein as "$P_{FEED}$."

The extraction air flowing to the header 14 from each of the extraction lines 60, 62, 64 may flow at different flow rates and flow pressures, as noted above. Accordingly, each of the extraction lines 60, 62, 64 may include respective check valves 82, 84, 86 disposed downstream of the flow control valves 72, 74, 76 but upstream of the header 14. Generally, the check valves 82, 84, 86 are configured to prevent a reverse flow situation in the extraction lines 60, 62, 64 when any one of $P_{GT1}$, $P_{GT2}$, or $P_{GT3}$ is lower than the others. For example, in an embodiment where $P_{GT1}$ is greater than $P_{GT2}$, the check valve 84 may block extraction air flowing through extraction line 60 from flowing into extraction line 62. Although the check valves 82, 84, 86 may block such undesirable flow, in embodiments where $P_{HEADER}$ is simply a combination of the pressures from each of the extraction lines 60, 62, 64, extraction air from any gas turbine engine having an extraction air pressure lower than that of $P_{HEADER}$ may not have a positive flow of extraction air through its respective extraction line and to the header 14. As noted above, the header 14 may combine the respective extraction air flows to form a combined extraction air flow having a pressure substantially equal to $P_{HEADER}$.

In accordance with the present embodiments, the controller 20 may substantially continuously monitor $P_{GT1}$, $P_{GT2}$, and $P_{GT3}$ and/or $P_{HEADER}$ and, when necessary, adjust $P_{HEADER}$ to maintain a substantially continuous flow of extraction air from all of the gas turbine engines 22, 24, 26. For example, in the illustrated embodiment, the controller 20 is communicatively connected to the header 14 and a pressure transducer 88 of the header 14 by a communication line 90. The controller 20 may monitor $P_{HEADER}$ at the transducer 88, and, when any one or more of $P_{GT1}$, $P_{GT2}$, or $P_{GT3}$ falls or has a base pressure below $P_{HEADER}$ (i.e., an indication of an asymmetric load condition or a degraded condition of one or more of the gas turbine engines), may reduce $P_{HEADER}$ to a pressure substantially equal to or to a predetermined amount lower, such as about 1%, 5%, 10%, 15%, 20%, 25%, or 30% lower, than the gas turbine having the lowest pressure of extraction air. As noted above, the predetermined amount may be representative of the piping pressure losses between the gas turbine engine having the lowest extraction air pressure and the header 14, such as to provide a substantially continuous positive air flow. As an example, the controller 20 may send control signals to the header 14, which causes the header 14 to release a certain amount of extraction air, which in turn may lower $P_{HEADER}$. In other embodiments, a compressor, which may be fluidly coupled to the header 14 in embodiments described below, may include a plurality of inlet guide vanes that may be adjusted to adjust $P_{HEADER}$. In still other embodiments, which are discussed in further detail with respect to FIG. 2, the controller 20 may be connected to some other pressure regulator configured to adjust $P_{HEADER}$. Additionally or alternatively, as noted above, one or more of the flow control valves 72, 74, 76 may be adjusted to adjust $P_{HEADER}$.

In response to reducing $P_{HEADER}$, the controller 20 may also send control signals to one or more of the flow control valves 72, 74, 76, such that $P_{GT1}$, $P_{GT2}$, or $P_{GT3}$ is reduced to prevent the release of excess extraction air. As an example, in the situation described above wherein $P_{GT1}$ and $P_{GT3}$ are greater than $P_{GT2}$, $P_{HEADER}$ may be reduced by the controller 20 to a predetermined amount, such as about 1%, 5%, 10%, 15%, 20%, 25%, or 30% lower than $P_{GT2}$. Indeed, the controller 20 is also configured to maintain the extraction air flows from each of the gas turbine engines 22, 24, 26 to the header 14 during and after a transition between a symmetric load condition in which the gas turbine engines 22, 24, 26 are operating at substantially equal loads, and an asymmetric load condition in which the gas turbine engines 22, 24, 26 are operating at substantially different loads by reducing $P_{HEADER}$. In response to reducing $P_{HEADER}$ by this amount, in some embodiments the controller 20 may adjust flow control valves 72 and 76 to reduce $P_{GT1}$ and $P_{GT3}$, respectively, to pressures substantially equal to $P_{GT2}$ and/or the new, adjusted $P_{HEADER}$. In certain embodiments, the extraction air combined at the extraction air header 14 may be used in the process of the plant component at a desired pressure, referred to herein as "$P_{PROCESS}$."

In the illustrated embodiment, the system 10 includes a flow control valve 92 disposed along a flow path 94 coupling the header 14 to the plant component 18. The controller 20 is operatively connected to the flow control valve 92 via a communication line 96, and may send control signals to an actuator 93 that moves the flow control valve 92 to open, close, or otherwise adjust the flow of the extraction air from the header 14 to the plant component 18. In such an embodiment, the flow control valve 92 may be operated to open, close, increase, or decrease the flow through the flow path 94 to adjust $P_{HEADER}$.

In the illustrated embodiment, the system 10 also includes a pressure transducer 100 disposed along a downstream portion 102 of the flow path 94 to ascertain the pressure of $P_{FEED}$ before delivery to the plant component 18. However, in other embodiments, such monitoring may be accomplished using other features or other transducers disposed elsewhere in the system 10. The pressure transducer 100 may send signals representative of $P_{FEED}$ to the controller 20 via a communication line 104 and, if suitable, the controller 20 may make adjustments to the various components of the system 10 to adjust $P_{FEED}$ accordingly. Moreover, in some embodiments, the controller 20 may be communicatively coupled to the plant component 18 via communication line 106 to ascertain fluctuations or other adjustments to $P_{PROCESS}$.

As noted above, in some embodiments, the system 10 may include various features external to the header 14 for controlling, regulating, or otherwise affecting $P_{HEADER}$. An embodiment of the system 10 having such a feature, more specifically a pressure regulator 110, is illustrated in FIG. 2. In the illustrated embodiment, the pressure regulator 110 is disposed downstream of the header 14, but upstream of the plant component 18. However, in some embodiments, the pressure regulator 110 may be integral with or directly attached to the header 14, for example to at least partially adjust $P_{HEADER}$. As an example, the controller 20 may send one or more control signals along a communication line 112 to an actuator 114 of a flow control valve 116. The flow control valve 116, which is disposed along an additional flow path 118, is configured to open or otherwise increase a flow of extraction air to the additional flow path 118 in response to the control signals. Substantially simultaneously, the controller 20 may send control signals to the actuator 93 of the flow control valve 92 so as to stop or otherwise reduce a flow along the downstream portion 102 of the flow path 94. The additional flow path 118 fluidly connects the header 14 with the pressure regulator 110, and the pressure regulator 110 with the plant component 18. Therefore, the additional flow path 118 may be considered to be an alternative or divergent flow path that diverges from the flow path 94 and re-converges with the flow path 94. In embodiments where the pressure regulator 110 is not used or is only partially used, the controller 20 may send control signals to the actuator 93 of the flow control valve 92 so as to start or otherwise increase the flow along the flow path 94 while closing valve 116 to stop or otherwise decrease the flow along the additional flow path 118.

The pressure regulator 110 may include one or more pressure regulating valves, and may be a single or multi-stage pressure regulator. As an example, the pressure regulator 110 may include one or more diaphragm valves, vee ball valves, choke valves, and the like that are capable of adjusting the flow of extraction air through the pressure regulator 110. Therefore, in one embodiment, the pressure regulator 110 may open one or more diaphragm valves to allow an increased flow of extraction air into the flow path 94, which reduces $P_{HEADER}$ and enables a substantially constant flow of extraction air from each of the gas turbine engines 22, 24, 26 (FIG. 1) when operating at full and/or part load.

Additionally or alternatively, the pressure regulator 110 may include a compressor 111 having a plurality of inlet guide vanes. In such embodiments, the controller 20 may send signals to the compressor 111 to adjust the position of the inlet guide vanes to affect the flow of extraction air through the flow path 94. For example, in one embodiment, as the guide vanes adjust their positions to allow more flow through the compressor 111 of the pressure regulator 110, a flow of extraction air through the flow path 94 may increase, which decreases $P_{HEADER}$. Conversely, as the guide vanes adjust to restrict flow through the compressor 111 of the pressure regulator 110, the flow of extraction air through flow path 94 may be reduced, with increases $P_{HEADER}$. Therefore, the inlet guide vanes of the compressor 111 may adjust $P_{HEADER}$ to allow a substantially continuous flow from each of the gas turbine engines 22, 24, 26 (FIG. 1) when any one or combinations of the engines are operating at full and/or part load.

As an example of the operation of system 10 having the pressure regulator 110, the controller 20, as noted above with respect to FIG. 1, may monitor any one or a combination of $P_{GT1}$, $P_{GT2}$, $P_{GT3}$, $P_{HEADER}$, $P_{FEED}$, $P_{PROCESS}$, and so on. In embodiments where each of the gas turbine engines 22, 24, 26 are operating at full load or design conditions, $P_{HEADER}$ may be sufficient for use in the plant component 18. As an example, $P_{HEADER}$ may have a pressure equal to the sum of $P_{PROCESS}$ and the piping losses between the header 14 and the plant component 18. In such an embodiment, no adjustments by the controller 20 may be necessary. However, in embodiments where any one of $P_{GT1}$, $P_{GT2}$, or $P_{GT3}$ is representative of a part load condition of any one of the gas turbine engines, the controller 20 may send one or more control signals along a communication line 119 to the pressure regulator 110 to cause $P_{HEADER}$ to be reduced. For example, the controller 20 may send control signals that cause the pressure regulator 110 to adjust (e.g., open) one or more pressure regulating valves by an amount correlated to the desired reduction in $P_{HEADER}$.

Upon exiting the pressure regulator 110, the extraction air may then enter the flow path 94, and may then be provided directly to the plant component 18. For example, in embodiments where $P_{HEADER}$ is sufficient for $P_{PROCESS}$, the extraction air may flow directly from the pressure regulator 110, along the flow path 94, and to the plant component 18. In other embodiments, such as when the controller 20 determines that the gas turbine engines 22, 24, 26 are in asymmetric operating conditions, $P_{HEADER}$ may be adjusted to provide substantially continuous flow of extraction air from all of the gas turbine engines 22, 24, 26. Accordingly, in one embodiment, $P_{HEADER}$ may be reduced by the pressure regulator 110. In such an embodiment, the resulting extraction air may be further processed (e.g., pressure boosted) before being provided to the plant component 18. Indeed, in some embodiments, as noted above, inlet guide vanes of the compressor 111 of the pressure regulator 110 may adjust $P_{HEADER}$. After the adjustment of $P_{HEADER}$, the operation of system 10 may be similar to that described above with respect to FIG. 1, with the controller 20 performing monitoring and, when part load conditions are detected, suitable pressure adjustment operations.

Therefore, during operation, the controller 20 may perform one or more monitoring and control routines to maintain substantially continuous extraction air flow from all operational gas turbine engines. An embodiment of such a method 120 that the controller 20 may perform as a computer-based routine is illustrated as a process flow diagram in FIG. 3. For example, the controller 20 may access or otherwise receive a tangible, non-transitory machine-readable medium or media, such as an optical storage device, a magnetic storage device, a solid-state memory device, or the like, having code with computer-executable routines in the form of method 120. Therefore, a storage medium or media, such as those mentioned above, may store the method 120 in the form of a computer-executable routine that may be performed by the controller 20. The controller 20 may access the code, and perform the acts of method 120 as a routine.

Initially, for example as the gas turbine engines come online, or, for reference, at the onset of performing the method 120, the controller 20 may receive pressure data from the plurality of pressure transducers mentioned above with respect to FIG. 1 and monitor the data for pressure fluctuations or variations (block 122). In performing the acts represented by block 122, the controller 20 may receive the pressure data and compare the pressure data to one or more predetermined quantities, such as predetermined pressure values for each set of data received from each pressure transducer. As an example, the controller 20 may monitor the extraction air pressure for each gas turbine engine, referred to herein as "$P_{GT}$," and $P_{HEADER}$. In embodiments where any one or a combination of these measurements indicates a part load condition (i.e., an asymmetric load condition), the controller 20 may proceed to make adjustments to the system 10. Accordingly, the controller 20 performs a query as to whether at least one gas turbine engine (GT) is operating at part load (query 124).

In embodiments where the pressure data indicates a part load condition, the controller 20 may then send control signals to various features of the system 10 to adjust $P_{HEADER}$ to a level equal to or an amount lower than the lowest $P_{GT}$ (block 126). For example, as noted above with respect to the discussion of FIGS. 1 and 2, $P_{HEADER}$ may be regulated at the header 14, by the pressure regulator 110 (e.g., using inlet guide vanes of the compressor 111), or by the flow control valves 72, 74, 76, 94, or any combination thereof. To account for the new $P_{HEADER}$, the controller 20 may send control signals to the flow control valves disposed along the extraction lines of each gas turbine engine to adjust their position (block 128). As an example, the flow control valves of the gas turbine engines operating at full load or design conditions may partially close, reducing the pressure of extraction air flowing through their respective conduits to the header 14. Once the acts represented by block 128 are complete, the header 14 may be at a pressure that is between approximately 1 and 30% lower than the lowest pressure of extraction air from all gas turbine engines. For example, $P_{HEADER}$ may be approximately 1%, 5%, 10%, 20%, or 25% lower than the lowest pressure of extraction air from all gas turbine engines. The controller 20 may continue monitoring $P_{HEADER}$ and $P_{GT}$, and may send extraction air to the downstream process as appropriate (block 130). For example, because $P_{HEADER}$ may be lower than $P_{PROCESS}$, other acts may be performed to bring the extraction air flow to a pressure suitable for $P_{PROCESS}$, such as compression or boosting, prior to provision to the downstream process 18. In other embodiments, $P_{HEADER}$ may be sufficiently high such that compression or boosting is not needed.

If the query 124 indicates that no gas turbine engines are operating at part load, then embodiments of the controller 20 may perform the acts represented by block 130 without making adjustments to the flow of extraction air. For example, in one embodiment where $P_{HEADER}$ floats on $P_{GT}$ (i.e., is determined by $P_{GT}$ and the pressure drop between the gas turbine engines and the extraction air header), $P_{HEADER}$ may be at a predetermined amount higher than $P_{PROCESS}$. The pressure differences between $P_{GT}$, $P_{HEADER}$, and $P_{PROCESS}$, as noted above, may account for piping pressure losses between the gas turbine engines 22, 24, 26 and the header 14, and the header 14 and the plant component 18. Accordingly, in embodiments where the gas turbine engines operate at full load, substantially continuous extraction air flow may be maintained by the controller 20 by maintaining a substantially continuous pressure drop from the gas turbine engines 22, 24, 26 to the plant component 18.

The system 10 described above with respect to FIGS. 1 and 2, as well as the control routine performed by a controller of the system 10 described above with respect to FIG. 3, may be implemented as a part of an energy-generation plant or other syngas-generating plant. An embodiment of such a plant, specifically an integrated gasification combined cycle (IGCC) plant 150, is illustrated diagrammatically in FIG. 4. The IGCC plant 150 may include features used to generate a gaseous fuel, such as a gasifier 152. The gasifier 152 may receive a fuel source 154, such as coal, and react the coal with water and oxygen, among other reactants, to generate a stream of generated syngas 156. Syngas stream 156, in a general sense, may include the components of syngas: carbon monoxide (CO) and hydrogen ($H_2$), as well as other gaseous components such as methane ($CH_4$), acid gases, water, and so on.

As noted above with respect to the operation of system 10, the gas turbine engines 22, 24, 26 may combust a mixture of compressed air and syngas. However, in some embodiments, it may be desirable to separate the syngas components from other components generated from the gasification reaction in order to increase combustion efficiency, increase carbon capture, capture useful by products, and so on. Accordingly, the generated syngas 156 may be sent to a gas processing unit (GPU) 158 for treatment. For example, the gas processing unit 158 may include an acid gas removal (AGR) unit, a carbon capture unit, or a combination thereof. Upon treatment at the GPU 158, a stream of treated syngas 160 may be sent to the gas turbine system 10.

Specifically, the stream of treated syngas 160 may be provided to a fuel header 162, which may separate the stream of treated syngas 160 into respective fuel streams 164, 166 to be combusted at, for example, the first and second gas turbine engines 22, 24. The gas turbine system 10, which, as noted above, may include two or more such gas turbine engines, may be used to drive one or more loads 168 by combusting the syngas and the compressed air. Specifically, hot combustion gases generated from the combustion process are used to drive the turbines 54, 56, 58 illustrated in FIG. 1. In turn, the rotational power generated by the turbines 54, 56, 58 may drive the loads 168, such as electrical generators. In addition, hot exhaust at the outlets of the turbines 54, 56, 58, may be used in various heat recovery systems 170, such as in one or more heat recovery steam generation (HRSG) units. As noted above, the compressors 30, 32, 34 may intake and compress more air than is needed by the gas turbine engines 22, 24, 26. Again, as noted above, at least a portion of the excess compressed air may be extracted and sent along extraction air paths 60, 62 to the extraction air header 14, which may combine the extraction air to generate a combined flow of extraction air.

If suitable, the extraction air flow is passed through and/or along the pressure regulator 110 and sent along the flow path 94 to an air separation unit (ASU) 166. As noted above, the ASU 166 may use a substantially constant pressure of extraction air to separate out a stream of oxygen ($O_2$) 172 and a stream of nitrogen ($N_2$) 174 from the compressed air. The stream 172, as illustrated, is provided as a reactant gas to the gasifier 152. Additionally, the $N_2$ stream 174 may be provided as a diluent to the gas turbine system 10. More specifically, the $N_2$ stream 174 may be sent to a N2 header 176, which may split the $N_2$ stream 174 into respective $N_2$ streams 178, 180 that are sent to the first and second gas turbine engines 22, 24.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   an extraction air header configured to receive a first extraction air flow from a first compressor of a first gas turbine engine and a second extraction air flow from a second compressor of a second gas turbine engine;
   an extraction air controller configured to maintain the first and second extraction air flows to the extraction air header during operational conditions in which the first and second gas turbine engines are symmetrically loaded and during operational conditions in which the first and second gas turbine engines are asymmetrically loaded; and
   a flow regulation device communicatively coupled to the extraction air controller and disposed downstream of the extraction air header, wherein the flow regulation device is configured to enable a pressure drop downstream of the extraction air header to cause a reduction of a header pressure of the extraction air header.

2. The system of claim 1, wherein the extraction air controller is configured to maintain the first and second extraction air flows to the extraction air header in a symmetric pressure condition and an asymmetric pressure condition, while the first and second gas turbine engines are operating, by controlling the flow regulation device.

3. The system of claim 1, wherein the extraction air controller is configured to maintain the first and second extraction air flows to the extraction air header during and after a transition between the symmetric load condition and the asymmetric load condition using the flow regulation device.

4. The system of claim 1, wherein the symmetric load condition represents first and second full load conditions on the respective first and second gas turbine engines, and the asymmetric load condition represents a partial load condition on the first gas turbine engine and the second full load condition on the second gas turbine engine.

5. The system of claim 1, wherein the extraction air controller is configured to reduce the header pressure of the extraction air header using the flow regulation device if the second extraction air flow has a pressure less than the first extraction airflow.

6. The system of claim 1, wherein the extraction air controller is configured to maintain, via the flow regulation device, the header pressure of the extraction air header at least less than or equal to a lowest pressure of the first and second extraction air flows.

7. The system of claim 6, wherein the flow regulation device is configured to maintain the header pressure in response to control signals from the extraction air controller.

8. The system of claim 1, comprising the first gas turbine engine, the second gas turbine engine, and an air separation unit (ASU) coupled to the extraction air header downstream of the flow regulation device.

9. A method, comprising:
monitoring a first signal representative of a first flow of extraction air from a first gas turbine engine and a second signal representative of a second flow of extraction air from a second gas turbine engine, or a third signal representative of a header pressure of an extraction air header, or a combination, with an extraction air controller; and
maintaining, using at least the extraction air controller and a flow regulation device disposed downstream of the extraction air header, the first and second extraction air flows to the extraction air header during operational conditions in which the first and second gas turbine engines are symmetrically loaded and during operational conditions in which the first and second gas turbine engines are asymmetrically loaded, wherein the flow regulation device is configured to enable a pressure drop downstream of the extraction air header to cause a reduction of a header pressure of the extraction air header.

10. The method of claim 9, wherein maintaining the first and second extraction air flows to the extraction air header comprises adjusting the header pressure, via the flow regulation device, if the first signal, the second signal, or the third signal, or a combination, indicate an asymmetric load condition.

11. The method of claim 10, wherein adjusting the header pressure comprises reducing the header pressure, via the flow regulation device, to a pressure substantially equal to or lower than the lowest pressure of the first and second extraction air flows.

12. The method of claim 11, wherein adjusting the header pressure comprises, in addition to adjusting the flow regulation device, adjusting a position of a first flow control valve disposed along a first conduit fluidly coupling the first gas turbine engine with the extraction air header, or adjusting a position of a second flow control valve disposed along a second conduit fluidly coupling the second gas turbine engine with the extraction air header, or any combination thereof.

13. The method of claim 9, comprising boosting, using the flow regulation device, the flow regulation device comprising a compressor, an air pressure downstream from the extraction air header if the first and second extraction air flows provide insufficient pressure to meet a pressure demand of a downstream system.

14. The method of claim 9, wherein maintaining, using at least the extraction air controller and the flow regulation device disposed downstream of the extraction air header, the first and second extraction air flows to the extraction air header comprises maintaining the first and second extraction air flows to the extraction air header during and after a transition between a symmetric load condition and an asymmetric load condition.

15. A system, comprising:
a non-transitory machine-readable medium, comprising:
stored instructions executable by an extraction air controller of a gas turbine system to perform a process comprising:
monitoring a first signal representative of a first flow of extraction air from a first gas turbine engine and a second signal representative of a second flow of extraction air from a second gas turbine engine, or a third signal representative of a header pressure of an extraction air header, or any combination thereof, with the extraction air controller; and
maintaining, using at least the extraction air controller, the header pressure of the extraction air header by controlling a compressor disposed downstream of, and fluidly coupled to, the extraction air header, such that the compressor is configured to draw the header pressure down.

16. The system of claim 15, wherein monitoring the first signal, the second signal, the third signal, or any combination thereof, comprises determining whether the first and/or the second gas turbine engine is operating at part load, and reducing the header pressure, via the compressor, to a level substantially equal to or lower than the lowest pressure of the first extraction air flow or the second extraction air flow if the first, second, or third signals indicate an asymmetric load condition.

17. The system of claim 16, wherein the process performed by executing the stored instructions comprises increasing an air pressure of a combined flow of extraction air flowing from the header when reducing the header pressure.

* * * * *